United States Patent
Hubbard et al.

[11] Patent Number: 6,055,786
[45] Date of Patent: *May 2, 2000

[54] HEAT WELD INDICATOR FOR THERMOPLASTIC ROOFING MEMBRANE

[75] Inventors: Michael J. Hubbard, Holland; Jeannemarie DeTorre, Maumee; Keith Watt, Sylvania; Raymond J. Weinert, Macedonia, all of Ohio

[73] Assignee: OMNOVA Solutions Inc., Fairlawn, Ohio

[*] Notice: Under 35 U.S.C. 154(b), the term of this patent shall be extended for 206 days.

[21] Appl. No.: 08/655,176
[22] Filed: May 30, 1996
[51] Int. Cl.⁷ ............................. E04D 11/02; G01K 13/00
[52] U.S. Cl. ............................... 52/409; 52/105; 116/205; 116/207; 116/216; 374/106; 374/162; 374/141
[58] Field of Search .............................. 52/408, 409, 411, 52/105, 745.06, 746.1, 746.11; 116/205, 207, 216, 217; 374/106, 141, 160, 161, 162

[56] References Cited

U.S. PATENT DOCUMENTS

| | | |
|---|---|---|
| 3,002,385 | 10/1961 | Wahl et al. . |
| 3,175,401 | 3/1965 | Geldmacher . |
| 3,430,491 | 3/1969 | Gignilliat, III . |
| 3,521,489 | 7/1970 | Finkelstein et al. . |
| 3,677,088 | 7/1972 | Lang . |
| 3,765,243 | 10/1973 | Pickett et al. . |
| 3,859,856 | 1/1975 | Keele et al. . |
| 4,362,645 | 12/1982 | Hof et al. ............................. 116/217 X |
| 4,459,046 | 7/1984 | Spirg . |
| 4,565,732 | 1/1986 | Stamper et al. ....................... 52/408 X |
| 4,601,588 | 7/1986 | Takahara et al. . |
| 4,743,557 | 5/1988 | Tiru et al. . |
| 4,753,188 | 6/1988 | Schmoegner . |
| 4,767,653 | 8/1988 | Renstrom ................................ 52/411 X |
| 4,827,686 | 5/1989 | Stamper et al. ........................... 52/408 |
| 4,829,539 | 5/1989 | Angus et al. . |
| 4,860,514 | 8/1989 | Kelly ................................ 52/746.11 X |
| 5,008,136 | 4/1991 | Chamberlain . |
| 5,152,611 | 10/1992 | Pieper et al. . |

Primary Examiner—Carl D. Friedman
Assistant Examiner—Kevin D. Wilkens
Attorney, Agent, or Firm—Robert F. Rywalski; David D. Murray

[57] ABSTRACT

A roofing membrane heat seal indicator provides a positive, visually perceptible indication that a joint or seam has been raised to a sufficiently high temperature to achieve a proper seal. The heat seal indicator is applied adjacent and parallel to an edge of a roofing membrane which will be arranged on a roof to form the upper (exposed) surface of an overlapping membrane seam. As the adjacent surfaces of the overlapped membranes are heated, heat passes through the membrane to the heat seal indicator. The heat seal indicator may be a temperature sensitive ink pigmented with material that changes color upon being subjected to a temperature indicating that the membrane surface has been subjected to a sufficiently high temperature to achieve an appropriate seal. Alternatively, the indicator may be an adhered layer of a ground or flaked polymer, such as polyethylene, which is initially opaque but melts to become translucent, thereby indicating obtainment of a proper sealing temperature. This indicator may be combined with a white or colored strip which enhances the change in the polyethylene. Another alternative comprehends the combination of a group indicator and molten polyethylene to form a pigmented polyethylene which is cooled, flaked, and adhered to roofing membranes. Another alternative is an embossed ridge or raised letters which may be covered with a thin, temperature sensitive polyvinyl chloride film or coating.

29 Claims, 4 Drawing Sheets

HEAT WELD INDICATOR FOR THERMOPLASTIC ROOFING MEMBRANE

BACKGROUND OF THE INVENTION

The invention generally relates to an indicator for thermoplastic roofing membranes and more specifically to a temperature sensitive indicator disposed on the upper surface of an overlapping roofing membrane which indicates that the adjacent, overlapping membranes have been subjected to a sufficiently high temperature to achieve a proper seal between them.

Within the last decade, elastomeric and thermoplastic roofing membranes have become significant products in the commercial and industrial marketplace. They provide good service life on flat and low slope roofs while representing a cost effective alternative to built up roofs and other previously available roofing systems. Roofing membrane products are typically manufactured as elongate sheet goods having a width of 3 feet (0.9 meters) or greater which are provided in rolls. The membrane is unrolled on a roof with edge adjacent portions of the membranes overlapped on the roof surface. The overlapped regions are then sealed together.

In order to achieve their service and cost saving potential, the elastomeric and thermoplastic roofing membranes must be continuously and tightly sealed along these overlapping regions. Typically, the overlapping regions are sealed by heating the adjacent surfaces of the overlapping membranes and then pressing the heated surfaces together, merging the material of the membranes and providing a strong seal. The integrity of the seal and thus of the overall roof depends upon appropriate and sufficient heat application to achieve melting of the membrane material and a positive, continuous seal between the overlapping membranes.

One approach to ensuring a membrane-to-membrane seal is the intentional excess application of heat. While this may achieve a seal, it is generally slow as the application of larger quantities, i.e., excess, heat takes longer than the application of the appropriate amount of heat. More importantly, however, excess heat application may result in damage to the roofing membranes which will ultimately shorten their service life. Furthermore, such an approach is energy inefficient. This approach has thus generally been found to be unsatisfactory.

Another approach to ensuring seal integrity involves checking, either visually or mechanically and either on a spot or continuous basis, the seal by manually lifting the edge of the upper membrane to determine if it is properly secured to the lower membrane. Obviously, spot checks can miss unexamined unsealed areas and continuous inspection of every seam is time consuming and therefore costly.

From the foregoing, it is apparent that a means for providing an indication of proper heat exposure and thus proper sealing of a membrane roofing seam would be highly desirable.

SUMMARY OF THE INVENTION

A roofing membrane heat seal indicator provides a positive, visually perceptible indication that a joint or seam has been raised to a sufficiently high temperature to achieve a proper seal. The heat seal indicator is applied to one surface of a roofing membrane adjacent an edge. The surface having the indicator is arranged on a roof to form the upper (exposed) surface of an overlapping membrane seam. The heat seal indicator is preferably applied parallel to a longitudinal edge of the membrane as a line, bead, dot or ridge. The heat seal indicator is also preferably disposed on the membrane a short distance from a longitudinal edge such that it is generally laterally centered over the seam region. As the adjacent surfaces of the overlapped membranes are heated, heat passes through the upper membrane to the heat seal indicator, causing a change in color, appearance or both.

The heat seal indicator may be a temperature sensitive ink or compound, such as cobalt salts that change color upon being subjected to a temperature indicating that the lower membrane surface has been subjected to a sufficiently high temperature to achieve an appropriate seal. Alternatively, the indicator may be an adhered layer of a ground or flaked polymer, such as a polyethylene, which is initially opaque but melts to become translucent, thereby indicating obtainment of a proper sealing temperature. If desired, both indicators may be combined wherein temperature sensitive particles are suspended in polyethylene or any polymeric resin melting at the proper temperature. The material is flaked and then adhered to or made into an ink and applied to the membrane surface. Alternatively, the polymer indicator may be disposed over a white or colored line on the membrane. Another alternative comprehends a raised ridge on the upper membrane surface which is covered by a distinctly colored material which melts when heated.

Thus is it an object of the present invention to provide a linear seal indicator for an overlapping roofing membrane seam for indicating that such membranes have been subjected to a sufficiently high temperature to achieve a seal.

It is a further object of the present invention to provide a roofing membrane heat seal indicator comprising a temperature sensitive organic material, ink, or inorganic salt.

It is a still further object of the present invention to provide a roofing membrane heat seal indicator comprising a layer of ground or flaked polyethylene or other material that melts at the proper temperature.

It is a still further object of the present invention to provide a roofing membrane heat seal indicator comprising a temperature sensitive ink, organic material, or organic salt and material which changes color upon exposure to a temperature indicating that such membrane has been sufficiently heated to enable a proper seal to be achieved.

It is a still further object of the present invention to provide a roofing membrane seal indicator comprising a ridge disposed along one edge of a roofing membrane which is covered with a distinctly colored material from the roofing membrane which melts and flows away from the ridge upon exposure to a temperature indicating that such membrane has been sufficiently heated to enable a proper seal to be achieved.

It is a still further object of the present invention to provide a roofing membrane heat seal indicator comprising a raised or embossed ridge having a layer of material which flows from the ridge upon exposure to a temperature indicating that such membrane has been sufficiently heated to enable a proper seal to be achieved.

Further objects and advantages of the present invention will become apparent by reference to the following specification and appended drawings wherein like numerals refer to the same component, element or feature.

DESCRIPTION OF THE PREFERRED AND ALTERNATE EMBODIMENTS

Figure 1:
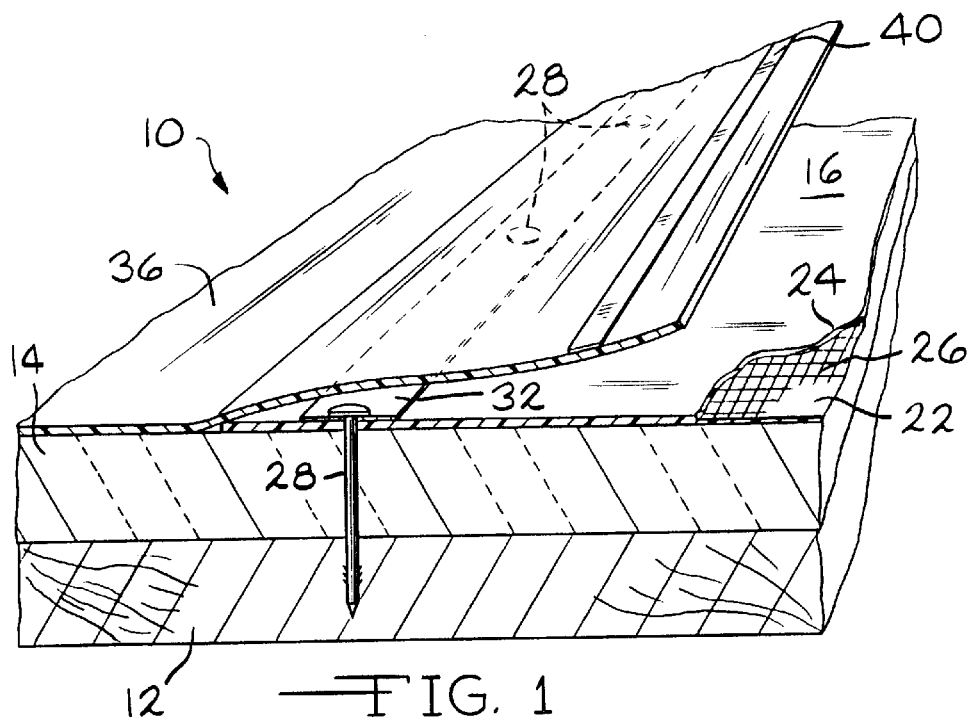
FIG. 1 is a fragmentary, perspective view of a portion of a membrane roof including a heat seal indicator according to the present invention in preassembly condition.

Referring now to FIG. 1, a portion of a membrane roof assembly is illustrated and generally designated by the reference numeral 10. The membrane roof assembly 10 typically includes a horizontal substrate or underlayment 12 which may be metal panels, concrete, gypsum board, wood boards or wood panels such as plywood, particle board and the like or other material capable of supporting and dispersing to supporting ceiling joists, girders or beams (not illustrated) the loads typically encountered by and on flat roofs. The horizontal underlayment 12 typically, though not necessarily, receives a layer of insulation 14 which may be styrofoam, polyisocyanurate or similar material having appropriate structural and insulating characteristics. A first or lower layer of roofing membrane 16 is rolled into place and rests upon the upper horizontal surface of the insulation 14 or the underlayment 12, if insulation is not utilized.

The first layer of roofing membrane 16 may be selected from a wide variety of thermoplastic and thermosetting materials that may be heat welded. For example, appropriate thermoplastic materials are polyvinyl chloride (PVC), thermoplastic olefin (TPO), polyethylene and polypropylene, chlorinated polyethylene (CPE), chloro-sulphinated polyethylene (CSPE) and polyisobutylene (PIB). Suitable thermosetting materials are EPDM, butyl rubber, neoprene and ENCP. Of these materials, PVC has typically been found to offer the highest performance/cost ratio but the other materials provide certain installation and service benefits and should all be considered viable alternatives to polyvinyl chloride in certain installations.

Preferably, the polyvinyl chloride membrane 16, as well as roofing membranes 16 of other materials, comprises a three layer composite or sandwich having upper and lower layers 22 and 24 of polyvinyl chloride disposed on opposite sides of a center woven or random weave layer of polyester or other fabric 26. The polyester fabric 26 reinforces the roofing membrane 16 as well as provides dimensional stability to the roofing membrane 16. The layer of fabric 26 must be porous, that is, have open spaces or interstices between the random or woven fabric strands so that the upper and lower layers of plastic material 22 and 24 may contact and merge with one another through the spaces, thereby tightly gripping the polyester fabric 26 but more importantly to ensure that the first layer of plastic material 22 and the second layer of plastic material 24 are intimately secured together to effectively form a unitary sheet. The roofing membrane 16 can also be one or more layers that are not reinforced.

The first or lower roofing membrane 16 is secured to the substrate by a plurality of fasteners such as screws 28 which extend through a reinforcing strip 32, the first roofing membrane 16, the insulation 14 and into the underlayment 12 as will be readily appreciated. A second or upper layer of roofing membrane 36 is preferably in all respects identical to the first or lower roofing membrane 16 that is, is composed of the same material and has the same reinforcement layer such that its physical properties are identical in order that autogenous bonding between adjacent layers may be readily achieved. Adjacent the edge of the second, upper roofing membrane 36 which is lapped over the first, lower roofing membrane 16 is an indicator strip 40. The indicator strip 40 is preferably positioned a distance from the edge of the upper roofing membrane 36 such that it is generally centered above that region which will be heat sealed.

For example, the width of a typical heat seal seam is about one and one-half to two inches (38 mm to 51 mm) measured from the edge of the upper roofing membrane 36. Thus, the indicator strip 40 is preferably disposed about one-half inch (12.7 mm) to one inch (25.4 mm) in, that is, to the left as illustrated in FIG. 1, from the edge of the upper roofing membrane 36. It will be appreciated that each roofing membrane 16 and 36 includes an indicator strip 40 along one edge and that the membranes are rolled out such that the indicator strip 40 is on the upper roofing membrane 36 of an overlapped seam facing up so that it is visible.

In its preferred embodiment, the indicator strip 40 is preferably a rolled on, i.e., printed, or sprayed thin layer of a heat sensitive material. The important feature of the heat sensitive material is that it have a relatively distinct color shift or appearance change within a relatively narrow temperature range. Preferable heat sensitive materials are salts of inorganic materials and organic materials, for example, cobalt phosphate, cobalt sulphate and boro-molybdates. For example, cobalt sulphate hydrate provides relatively abrupt and sharply defined color change in the region of 190° F. (88° C.) to 210° F. (99° C.) due, it is believed, to the boiling away of water associated with certain hydrated molecules. Typical color changes which will occur with such compositions are green to yellow and red to purple.

This temperature indication range makes it compatible with the welding of polyvinyl chloride which typically occurs in a temperature range of between 240° F. (115° C.) and 280° F. (137° C.). Other roofing materials will, of course, require heat sensitive materials having higher or lower color shift points which typically will be 40° F. to 80° F. (22° C. to 44° C.) below the melting point of the membrane material, depending primarily upon the heat transfer characteristics of the membrane material.

A broad range of heat sensitive materials may be utilized with the present invention. For example, the metals of Group I B, e.g., zirconium, Group II B, e.g. zinc, Group III B, e.g. yttrium, Group IV B, e.g. zirconium, Group V B, e.g. vanadium, Group VII B, e.g. molybdenum and chromium, Group VIII B, e.g. nickel, cobalt and iron all have possible utility as indicators. All materials have an appropriate heat indicating property since they are capable of forming highly colored complexes.

There are also suitable color indicators that are organic in nature. For example, ink based organic dyes have shown promise due to dramatic color changes, for example, orange to green, that they undergo upon being subjected to temperatures suitable for roofing membrane welding. Also, microballoon technology can be used. Here, too, heat indicating materials are compounds that will intermingle upon rupture of the polymer microballoon membranes at the appropriate temperature. Group I A, Group II A and the Group VII elements can be used as the indicators in this instance.

It will be appreciated that a certain amount of experimentation may be necessary to determine the precise color shift temperature appropriate for a given composition and thickness of the roofing membranes 16 and 36 to indicate a secure seal because the heat is supplied to the lower face of the upper roofing membrane 36 to which the indicator 40 is affixed. Thus, not only the melt characteristics of the material which relate to the achievement of a secure seal but also the thickness of the material and the heat transfer characteristics therethrough will determine how much heat is transferred through the upper roofing membrane 36 to its upper surface and thus to what temperature the upper surface rises and the temperature at which the indicator should change.

Figure 2:
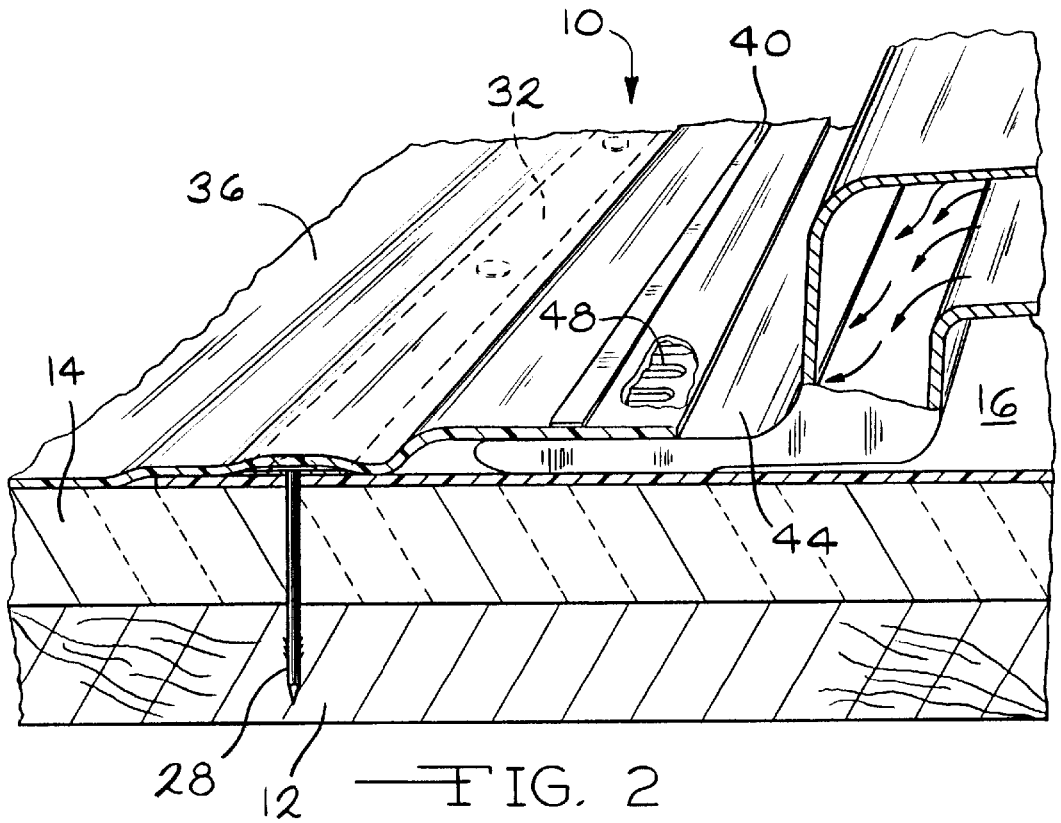
FIG. 2 is a fragmentary, perspective view of a portion of a membrane roof including a heat seal indicator according to the present invention during the sealing operation.

Referring now to FIG. 2, the sealing of the roofing membranes 16 and 36 is illustrated. It is generally achieved by the use of a hot air weld tool 44 which is inserted between the overlapping roofing membranes 16 and 36. The weld tool 44 is suitably supported on the horizontal deck of the roof represented by the first, lower roofing membrane 16 and is supplied, by an electrical resistance heater and blower (not illustrated), with a forced stream of hot air which exits the weld tool 44 through a plurality of openings 48. The weld tool 44 delivers heat to the upper surface of the first, lower roofing membrane 16 and the lower surface of the second, upper roofing membrane 36 in a controlled manner to sufficiently heat and soften these faces such that when the weld tool 44 is removed, i.e., slid farther along the intended seam longitudinally, and pressure is applied by an associated roller or pressure plate (both not illustrated), the surfaces bond as illustrated in FIG. 3.

Figure 3:
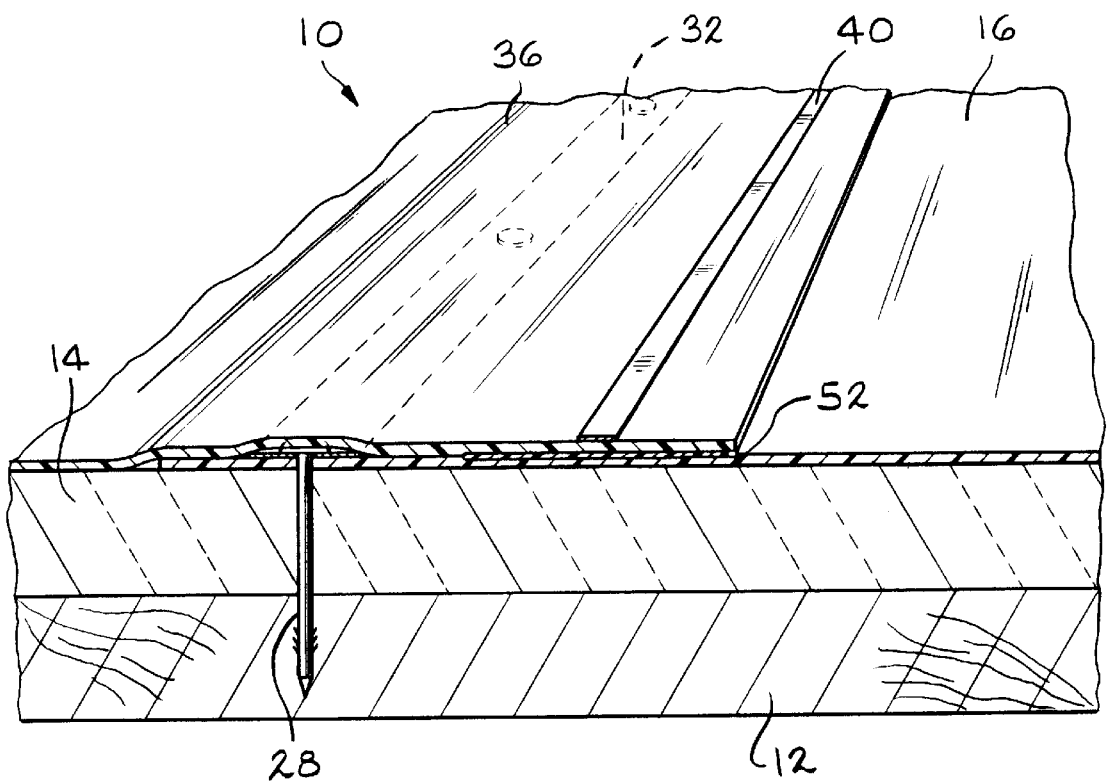
FIG. 3 is a fragmentary, perspective view of a portion of a membrane roof including a heat indicator according to the present invention after the sealing operation.

As also illustrated in FIG. 3, a continuous bond or seal 52 is achieved after the weld tool 44 heats the roofing membranes 16 and 36 and the adjacent surfaces of the lower roofing membrane 16 and the upper roofing membrane 36 are pressed together. It will also be appreciated that if sufficient heat has been applied to the surfaces that a suitable bond 52 can be achieved, a sufficient quantity of heat will have migrated through the upper roofing membrane 36 to the strip indicator 40 to achieve a color change. In the case of a typical seam where the roofing membranes 16 and 36 are polyvinyl chloride, a melt temperature of between 240° F. (115° C.) and 280° F. (137° C.) is exhibited and heating the roofing membranes 16 and 36 to within this temperature range has been found desirable. Given a typical thickness of the polyvinyl chloride roofing membranes 16 and 36, of 0.048 inches, (1.2 mm), an indicator shift temperature of approximately 190° F. (88° C.) has been found to provide a highly reliable indication that the adjacent surfaces of the roofing membranes 16 and 36 have been elevated to a temperature sufficiently high to predictably and repeatedly achieve a seal of high integrity.

Figure 4:
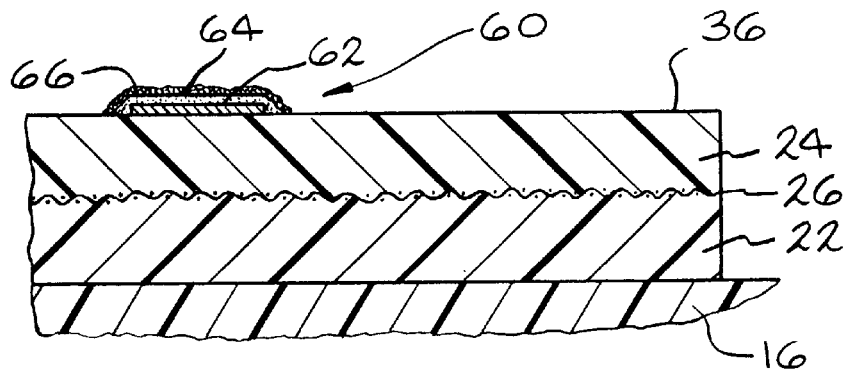
FIG. 4 is a fragmentary, full sectional view of overlapped roofing membranes including a first alternate embodiment heat seal indicator according to the present invention.
Figure 5:
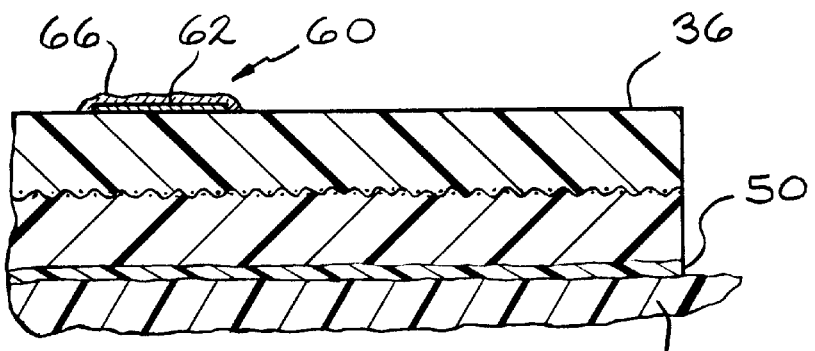
FIG. 5 is a fragmentary, full sectional view of a roofing membrane seam including a first alternate embodiment heat seal indicator according to the present invention.

Turning now to FIGS. 4 and 5, a first alternate embodiment heat seal indicator is illustrated and designated by the reference numeral 60. Once again, the heat seal indicator 60 is utilized with a first, lower roofing membrane 16 and a second, upper roofing membrane 36. Preferably, each of the roofing membranes 16 and 36 are a composite having a lower layer 22 and upper layer 24 and a woven or nonwoven matrix of polyester threads 26 which is securely mechanically embedded within the layers 22 and 24. The first alternate embodiment temperature indicator 60 includes a line or strip of any ink or heat sensitive material 62 which may be in all respects identical to the indicator strip 40 of the preferred embodiment. Applied to the upper surface of the heat sensitive material 62 is a layer of acrylic adhesive 64. The layer of acrylic adhesive 64 fully covers the dots or strip of heat sensitive material 62 such that the strip may, in turn, be fully covered and obscured by an outer or upper layer of powdered or flaked material 66 such as powdered or flaked polyethylene. The material 66 is preferably selected from a broad group of powdered or flaked materials such as hydrocarbon ester resins, paraffin waxes and polyvinyl chloride resins or other materials that undergo thermal transition, e.g. melt, and undergo either a change in color, a change in transparency or both over a relatively narrow and predictable temperature range.

For example, the powdered polyethylene first noted is substantially white and opaque in its as produced form. However, when exposed to temperatures of 190° (88° C.) or higher, the polyethylene melts, recombines to a solid film and becomes translucent or, if the film is relatively thin, very nearly transparent. Suitable polyethylene will exhibit viscosity numbers at 284° F. (140° C.) of between about 180 and 450 on the Brookfield Scale. Thus, as illustrated in FIG. 5, once the adjacent surfaces of the roofing membranes 16 and 36 have been elevated to a temperature sufficient to achieve a bond or seal therebetween, the powdered material 66, having been chosen to exhibit a melting temperature compatible with the membrane sealing temperature and heat transfer characteristics of the second, upper roofing membrane 36, the heat seal indicator 60 will melt. In the first alternate embodiment, not only will the change from white or opaque to translucent of the powdered or flaked material 66 be visible, but such translucency will also expose the strip of heat sensitive material 62. Thus, the first alternate embodiment indicator 60, when melted, allows the heat sensitive material leaving group to come off facilitating a color change. A specific advantage of the powdered, flaked or strip polyethylene material is that it is a one-shot, i.e., non-reversing indicator which will not revert to its original color over time.

Other polymers that are suitable for the covering layer of the first alternate embodiment heat seal indicator 60 because they are opaque at one temperature and change appearance at another defined temperature can include the polyolefins of which polyethylene is a common example, poly(meth) acrylates, styrenics (especially block copolymers) and vinyl ester copolymers.

Figure 6:
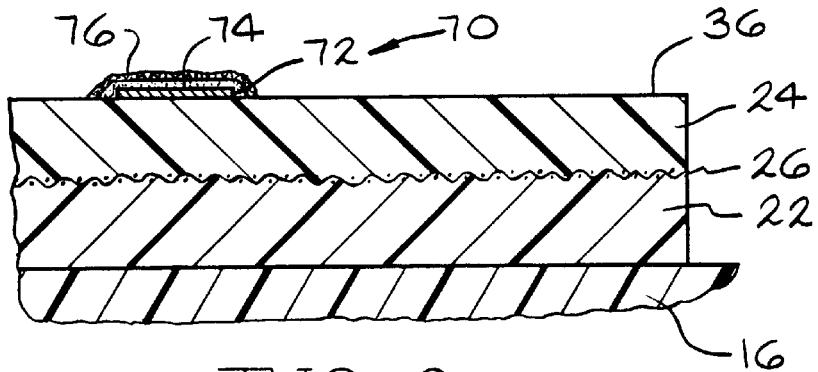
FIG. 6 is a fragmentary, full sectional view of overlapped roofing membranes including a second alternate embodiment heat seal indicator according to the present invention.
Figure 7:
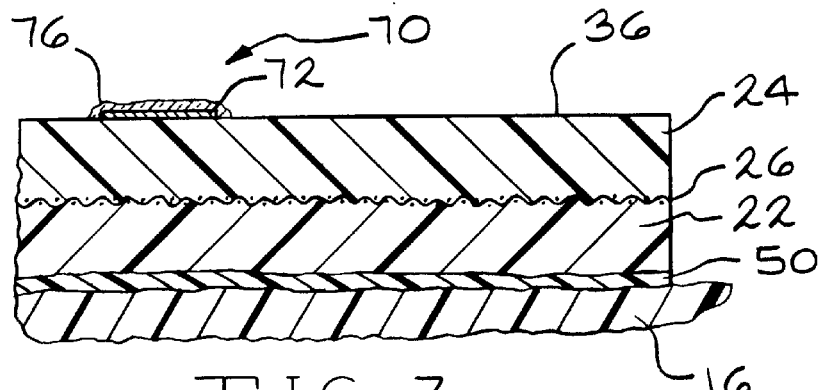
FIG. 7 is a fragmentary, full sectional view of a roofing membrane seam including a second alternate embodiment heat seal indicator according to the present invention.

Referring now to FIGS. 6 and 7, a second alternate embodiment heat seal indicator is illustrated and designated by the reference numeral 70. In the second alternate embodiment heat seal indicator 70, a highly visible continuous strip of white or colored pigment 72 is applied to the upper surface of the upper roofing membrane 36 adjacent a longitudinal edge and generally centrally aligned with the region which will be sealed as described with regard to the preferred embodiment illustrated in FIGS. 1 through 3. The pigment 72 may also include indicia, or other printed information or legends such as the words "SEALED," "SECURED," "HEATED" or "PROPERLY HEATED" on a repeating basis along its length. Atop the pigment 72 is preferably placed a suitable acrylic adhesive 74 which is then used to adhere a strip of material or powdered or flaked material 76 which may be selected from a broad range of materials such as flaked polyethylene, hydrocarbon ester resins, paraffin waxes, polyvinyl chloride resins, or any other material recited or suggested above with regard to the first alternate embodiment 60 which, over a narrow temperature range, melts and changes from an opaque state to a translucent or transparent state.

As illustrated in FIG. 7, after sufficient heat has been applied to the adjacent surfaces of the roofing membranes 16 and 36 to ensure a secure bond 50 is achieved between the first, lower roofing membrane 16 and second, upper roofing membrane 36, the strip, flaked or powdered material 76 of the second alternate embodiment heat seal indicator 70 has also received sufficient heat or been subjected to sufficiently high temperature to melt, thereby exposing the pigment 72 and any printed text or indicia appearing thereon, thus indicating proper application of heat.

Figure 8:
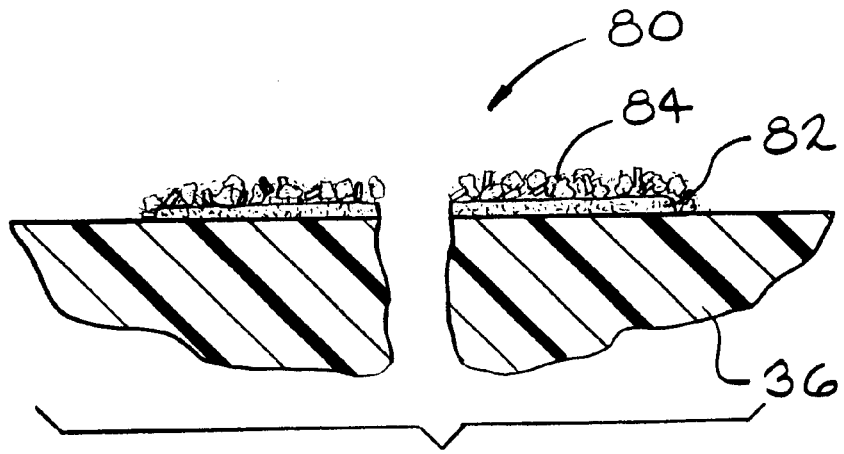
FIG. 8 is an enlarged, fragmentary, full sectional view of overlapped roofing membranes including a third alternate embodiment heat indicator according to the present invention.
Figure 9:
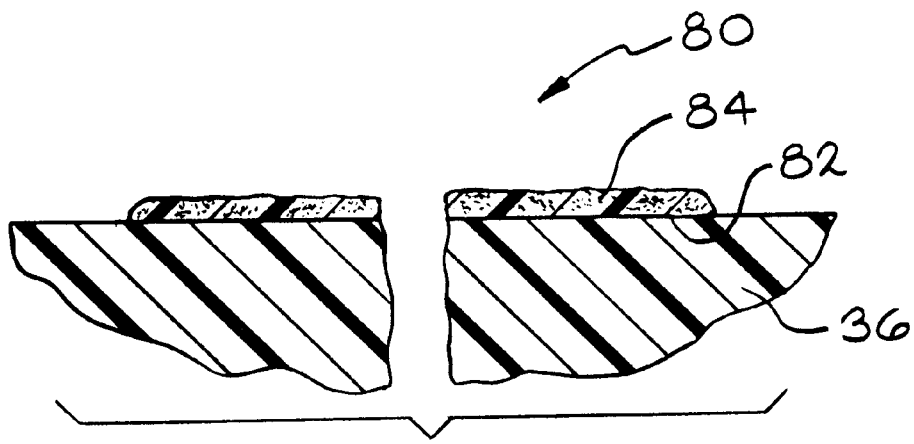
FIG. 9 is an enlarged fragmentary, full sectional view of a roofing membrane seam including a third alternate embodiment heat indicator according to the present invention.

Referring now to FIGS. 8 and 9, a third alternate embodiment heat seal indicator is illustrated and designated by the reference numeral 80. In the third alternate embodiment heat seal indicator 80, a layer of adhesive is disposed upon the upper surface of the second, upper roofing membrane 36 in edge adjacent fashion, that is, approximately one-half inch (12.7 mm) from one longitudinal edge of the roofing membrane 36. The adhesive layer 82 may be either a band applied to the surface of the roofing membrane 36 by spraying or roller application or may be double-sided thin adhesive film. Applied to and disposed upon the upper surface of the adhesive layer 82 is a heat seal indicator layer 84. The indicator layer 84 is preferably pigmented polyethylene and includes finely ground or flaked particles of a polyethylene based heat sensitive ink suspension. That is, particles of a heat sensitive material, such as the indicator of the preferred embodiment, are mixed into molten polyethylene and the mixture is cooled and solidified. The resulting solid is then ground or flaked to render the doped polyethylene white and substantially opaque. It is then adhered to the roofing membrane 36 by the adhesive layer 82 and forms a heat seal indicator layer 84.

As illustrated in FIG. 9, when sufficient heat has migrated through the second, upper roofing membrane 36, to raise the third alternate embodiment indicator 80 to a temperature typically in the range of 190° F. (88° C.) to 210° F. (99° C.) as an indication that the seam region has reached a temperature sufficiently high to achieve a strong seal, the polyethylene flakes will begin to melt and change from a white, substantially opaque material into a translucent, substantially clear material and the heat sensitive material particles suspended therein will likewise undergo a color change. Thus the indicator 80 will undergo substantially unmistakable and redundant color and light transmission changes by the flaked polyethylene and the heat sensitive material, thereby providing improved indication visibility.

Figure 10:
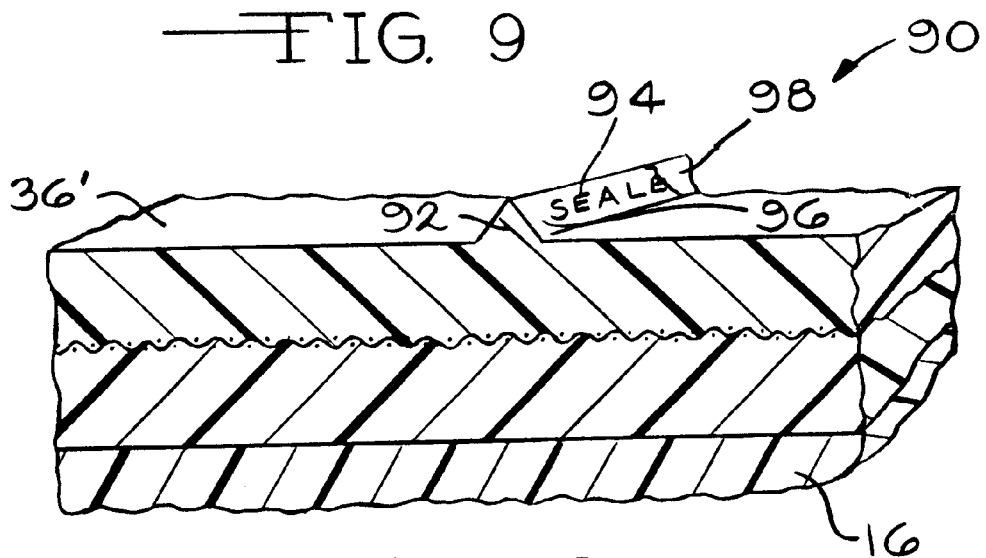
FIG. 10 is a fragmentary, full sectional view of overlapped roofing membranes including a fourth alternate embodiment heat indicator according to the present invention.

Referring now to FIG. 10, a fourth alternate embodiment heat seal indicator 90 is illustrated. The fourth alternate embodiment heat seal indicator 90 comprehends manufacture of the roofing membranes 16 and 36 with an embossed, raised ridge 92 disposed along one edge of the roofing membranes 16 and 36' approximately one-half inch (12.7 mm) in from the edge such that it will generally be centered over the seal region. The embossed or raised ridge 92 is preferable triangular in cross-section and defines edges inclined at least a 45° angle to the horizontal. As presently envisioned, the ridge 92 may be integrally formed along one edge of the roofing membranes 16 and 36' by embossing or a similar process during the manufacture of membrane. Typically, such embossing will be achieved by a roller or wheel (not illustrated) disposed in intimate contact with one surface of the membrane 36' during production and while it is still moldable. Accordingly, the wheel may also include suitable indicia 94 such as "SEALED," "HEATED," "PROPERLY HEATED" or the like appearing in negative on the embossing wheel such that a positive, projecting embossed image is created on the oblique sides of the ridge 92. Alternatively, a layer of paint or other pigment 96 may be applied by spraying, rolling or other means to the raised ridge 92.

Disposed over the raised ridge 92 is a thin film, for example, one mil thick, polyvinyl chloride tape 98 or similar material which is opaque in its initially applied, unheated state. As heat is applied to the seam area, heat also migrates through the second, upper roofing membrane 36 and heats and melts the PVC layer 98 such that it flows down the sides of the ridge 92 thereby exposing it and, the indicia 94 or the paint 96, if it includes same. Alternately, the thin film layer 98 may be replaced by a layer of flaked or ground polyethylene particles such as described in the first and second alternate embodiments which are adhered either by a sprayed adhesive layer or a thin double-sided adhesive tape.

The foregoing disclosure is the best mode devised by the inventors for practicing this invention. It is apparent, however, that heat indicators incorporating modifications and variations will be obvious to one skilled in the art of roofing membrane seal indicators. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. A roofing membrane and seal indicator for use in a membrane roofing installation comprising, in combination, a first roofing membrane defining a melting temperature and having a first edge and first opposed surfaces, and a temperature indicating strip disposed on one surface of said first membrane, said temperature indicating strip having a first appearance below a preselected temperature and a second, distinct appearance after having been exposed to a temperature above said preselected temperature, said preselected temperature being less than said melting temperature.

2. The roofing membrane and seal indicator of claim 1 further including a second roofing membrane having second opposed surfaces, a portion of said second roofing membrane overlapping a portion of said first roofing membrane.

3. The roofing membrane and seal indicator of claim 2 wherein said first and said second roofing membranes are fabricated of the same material.

4. The roofing membrane and seal indicator of claim 1 wherein said temperature indicating strip is cobalt based.

5. The roofing membrane and seal indicator of claim 1 wherein said temperature indicating strip includes polyethylene particles.

6. The roofing membrane and seal indicator of claim 1 wherein said temperature indicating strip includes a ridge extending upwardly from said one surface of said first membrane.

7. The roofing membrane and seal indicator of claim 6 wherein said ridge includes indicia disposed thereon.

8. A roofing membrane having a heat seal indicator for providing an indication of proper heat application comprising, in combination, an elongate sheet of roofing membrane having a longitudinal edge and a pair of opposed surfaces and a temperature indicator disposed on one of said surfaces and along said edge, said temperature indicator having a first appearance below a preselected temperature and a second, distinct appearance after having been exposed to said preselected temperature, said preselected temperature being below a melting point of said membrane.

9. The roofing membrane and heat seal indicator of claim 8 wherein said temperature indicator is disposed parallel to and spaced from said edge.

10. The roofing membrane and heat seal indicator of claim 8 wherein said temperature indicator is a continuous strip.

11. The roofing membrane and heat seal indicator of claim 8 wherein said temperature indicator is a strip of heat sensitive material.

12. The roofing membrane and heat seal indicator of claim 8 wherein said temperature indicator includes a layer of colored pigment and a layer of substantially opaque polyethylene.

13. The roofing membrane and heat seal indicator of claim 8 wherein said temperature indicator includes a strip of a heat sensitive material and a covering layer of plastic having a melting point at said preselected temperature.

14. The roofing membrane and heat seal indicator of claim 8 wherein said temperature indicator is pigmented polyethylene.

15. The roofing membrane and heat seal indicator of claim 8 wherein said temperature indicator includes a raised ridge and a substantially opaque layer of material disposed on said ridge, said substantially opaque material having a melting point at said preselected temperature.

16. A roofing membrane having an indicator for providing visually perceptible evidence of sufficient heat application for sealing comprising, in combination, an elongate sheet of roofing membrane having a longitudinal edge and a pair of opposed surfaces and a temperature indicator disposed on one of said surfaces along said edge, said temperature indicator having a first appearance below a preselected temperature and a second appearance distinct from said first appearance after having been exposed to said preselected temperature, said preselected temperature being below a melting point of said membrane.

17. The roofing membrane and indicator of claim 16 wherein said roofing membrane is polyvinyl chloride, said temperature indicator defines a continuous strip disposed parallel to said edge and said preselected temperature is between 190° F. and 210° F.

18. The roofing membrane and indicator of claim 16 wherein said temperature indicator includes a raised ridge and a substantially opaque layer of material disposed on said ridge, said substantially opaque material having a melting point at said preselected temperature.

19. The roofing membrane and indicator of claim 16 wherein said temperature indicator is pigmented polyethylene.

20. The roofing membrane and indicator of claim 16 wherein said temperature indicator includes a strip of heat sensitive material and a covering layer of plastic having a melting point at said preselected temperature.

21. The rooking membrane and indicator of claim 16 wherein said temperature indicator includes a layer of colored pigment and a layer of substantially opaque polyethylene.

22. A membrane roofing assembly having a heat seal indicator comprising, in combination, a first roofing membrane having a first edge and first opposed surfaces, a second roofing membrane having a second edge and second opposed surfaces, said first and said second membranes having a common melting temperature, a portion of said second membrane disposed in overlapping relationship with a portion of said first membrane and a visual temperature indicator disposed on one of said surfaces of said portion of said second membrane, said visual temperature indicator defining a composition having a first appearance below a preselected temperature, said preselected temperature being less than said melting temperature and a second distinct, appearance after having been exposed to said preselected temperature.

23. The membrane roofing assembly of claim 22 wherein said membranes are laminates of thermoplastic material.

24. The membrane roofing assembly of claim 22 wherein said temperature indicator is a salt of a transition metal.

25. The membrane roofing assembly of claim 22 wherein said temperature indicator includes a layer of colored pigment and a layer of substantially opaque material selected from the group of polyethylene, polyolefin, polymethacrylates, or polyvinyl esters.

26. The membrane roofing assembly of claim 22 wherein said temperature indicator includes a strip of cobalt based material and a covering layer of plastic having a melting point at said preselected temperature.

27. The membrane roofing assembly of claim 22 wherein said temperature indicator is pigmented polyethylene.

28. The membrane roofing assembly of claim 22 wherein said temperature indicator includes a raised ridge on said one surface of said second membrane and a substantially opaque layer of material disposed on said ridge, said substantially opaque material having a melting point equal to said preselected temperature.

29. The membrane roofing assembly of claim 22 wherein said temperature indicator defines a continuous strip disposed along said edge of said second roofing membrane.

* * * * *